US011362997B2

(12) United States Patent
Raphael et al.

(10) Patent No.: US 11,362,997 B2
(45) Date of Patent: Jun. 14, 2022

(54) REAL-TIME POLICY RULE EVALUATION WITH MULTISTAGE PROCESSING

(71) Applicant: International Business Machines Corporation, Armonk, NY (US)

(72) Inventors: Roger C. Raphael, San Jose, CA (US); Rajesh M. Desai, San Jose, CA (US); Iun Veng Leong, Union City, CA (US); Brian Joseph Owings, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 16/655,022

(22) Filed: Oct. 16, 2019

(65) Prior Publication Data
US 2021/0119970 A1   Apr. 22, 2021

(51) Int. Cl.
*H04L 9/40* (2022.01)
*H04L 41/0893* (2022.01)
*G06F 16/2453* (2019.01)

(52) U.S. Cl.
CPC ...... *H04L 63/0263* (2013.01); *G06F 16/2453* (2019.01); *H04L 41/0893* (2013.01); *H04L 63/20* (2013.01); *G06F 2221/2141* (2013.01)

(58) Field of Classification Search
CPC . H04L 63/0263; H04L 41/0893; H04L 63/20; G06F 16/2453; G06F 2221/2141; G06F 21/6218
See application file for complete search history.

(56) References Cited

U.S. PATENT DOCUMENTS 8,150,816 B2   4/2012   Lim
8,407,757 B2   3/2013   Graham et al.
(Continued)

FOREIGN PATENT DOCUMENTS

WO   WO-2009145712 A1 * 12/2009   ............. H04L 69/22
WO   WO-2016049802 A1 *  4/2016   ......... H04L 12/6418

OTHER PUBLICATIONS

Hoagland et al., "Security Policy Specification Using a Graphical Approach," UC Davis Computer Science Technical Report CSE-98-3, Jul. 22, 1998, 28 pages.
(Continued)

*Primary Examiner* — Mohammad W Reza
(74) *Attorney, Agent, or Firm* — Yee & Associates, P.C.

(57) ABSTRACT

A method, apparatus, system, and computer program product evaluate an information asset with a corpus of policies in conjunction with the context of access including a specific user. A large corresponding set of rules in the policy corpus are identified by computer system. A continuous process of rule evaluation occurs against information asset metadata wherein a series of processing including set of common subexpressions between the predicates of all active rules, pre-evaluation, compaction and storage are identified by the computer system in the policy and rule corpus. Metadata for the information asset is applied by the computer system to the set of common subexpressions to form partially evaluated rules for the policy. The partially evaluated rules henceforth compacted are stored by the computer system in association with the information asset. Subsequently the partially evaluated rules are a compressed form of the rule corpus for the policies in the system and hence reduce computer resources and significantly improve the response tome used to evaluate the enforcement decision for the said information asset with the policy in conjunction with the context of access. The process can be repeated each time at (Continued)

least one of the metadata or the policy changes to provide continuous processing of rules to maintain compacted up-to-date partially evaluated rules to enforce the policy.

20 Claims, 10 Drawing Sheets

(56) References Cited

U.S. PATENT DOCUMENTS

| | | | |
|---|---|---|---|
| 2008/0285454 A1* | 11/2008 | Corl, Jr. | G06N 20/00 370/235 |
| 2015/0235126 A1 | 8/2015 | de Borst | |
| 2018/0341490 A1* | 11/2018 | DeHon | G06F 9/30101 |

OTHER PUBLICATIONS

Madsen, "Appendix A: Data Governance Policies and Procedures," Healthcare Business Intelligence: A Guide to Empowering Successful Data Reporting and Analytics, 2012, pp. 243-251.
Karel, "Data Governance Policies Shape Organizational Behaviors," Holistic Data Governance Solutions, Jan. 2, 2014, 6 pages.
"Data Governance Policy," Australian Catholic University, 1998-2019, 6 pages.
"eXtensible Access Control Markup Language (XACML) Version 3.0," OASIS Standard, Jan. 22, 2013, 131 pages.
Franzon, "RWDG Slides: Writing Data Governance Policies & Procedures," Dataversity, Feb. 22, 2016, 7 pages.
Mell et al., "The NIST Definition of Cloud Computing," NIST Special Publication 800-145, 7 pages.

\* cited by examiner

REAL-TIME POLICY RULE EVALUATION WITH MULTISTAGE PROCESSING

BACKGROUND

1. Field

The disclosure relates generally to an improved computer system and, more specifically, to optimally evaluating rules in policies over a number of enforcement domains, and constant time performance for a computer system. Still more particularly, the present disclosure relates to a method, apparatus, system, and computer program product for evaluating rules in a policy in multiple processing stages, involving compaction, pre-evaluation, and fast access, to enforce the declared policies in a computer system independent of their quantity.

2. Description of the Related Art

Organizations such as companies and government agencies have large computer systems. A computer system for an organization can include one or more of the Internet, an intranet, a local area network (LAN), a metropolitan area network (MAN), a wide area network (WAN), a cloud computing environment, or other suitable networks. The computer system for an organization can have a multitude of policies that are applied to the computer system. These policies can be based on institutional guidelines, security standards, privacy laws, government regulations, or other sources. Further, some organizations can have very large bodies of data that need to be governed and managed using the policies.

Event logging systems and audits mechanisms can be used to determine whether policies are being followed. Additionally, active mechanisms such as malware scanners, active directories, firewalls, routers, access control lists, and other mechanisms can be used to actively enforce policies in a computer system.

A computer system for an organization may have hundreds or thousands of active policies for enforcement. Further, policies can be added, removed, modified, or some combination thereof. Enforcing policies in a computer system can be resource intensive. Further, some organizations can have very large bodies of data that need to be governed and managed using policies. As a result, enforcing policies and reducing violation of policies can be a daunting task in a computer system for an organization.

SUMMARY

According to one embodiment of the present invention, a method for evaluating an information asset with a policy is presented. Rules in the policy are identified by a computer system. A set of common subexpressions between the rules is identified by the computer system in the policy. Metadata for the information asset is applied by the computer system to the set of common subexpressions to form partially evaluated rules for the policy. The partially evaluated rules are stored by the computer system in association with the information asset. The partially evaluated rules are a compressed form of the rules for the policy and reduce computer resources used to evaluate the information asset with the policy.

According to another embodiment of the present invention, a policy enforcement system comprises a computer system that identifies rules in a policy and identifies common subexpressions between the rules in the policy. The computer system applies metadata for the information asset to the common subexpressions to form partially evaluated rules for the information asset. The computer system stores the partially evaluated rules in association with the information asset. The partially evaluated rules are a compressed form of the rules for the policy and reduce computer resources used to apply the policy to the information asset.

According to yet another embodiment of the present invention, a computer program product for evaluating an information asset with a policy comprises a computer-readable-storage medium with first program code, second program code, third program code, and fourth program code stored on the computer-readable storage medium. The first program code is executed to identify rules in the policy. The second program code is executed to identify common subexpressions between the rules in the policy. The third program code is executed to apply metadata for the information asset to the common subexpressions to form partially evaluated rules for the information asset. The fourth program code is executed to store the partially evaluated rules in association with the information asset. The partially evaluated rules are a compressed form of the rules for the policy and reduce computer resources used to apply the policy to the information asset.

DETAILED DESCRIPTION

Figure 1:
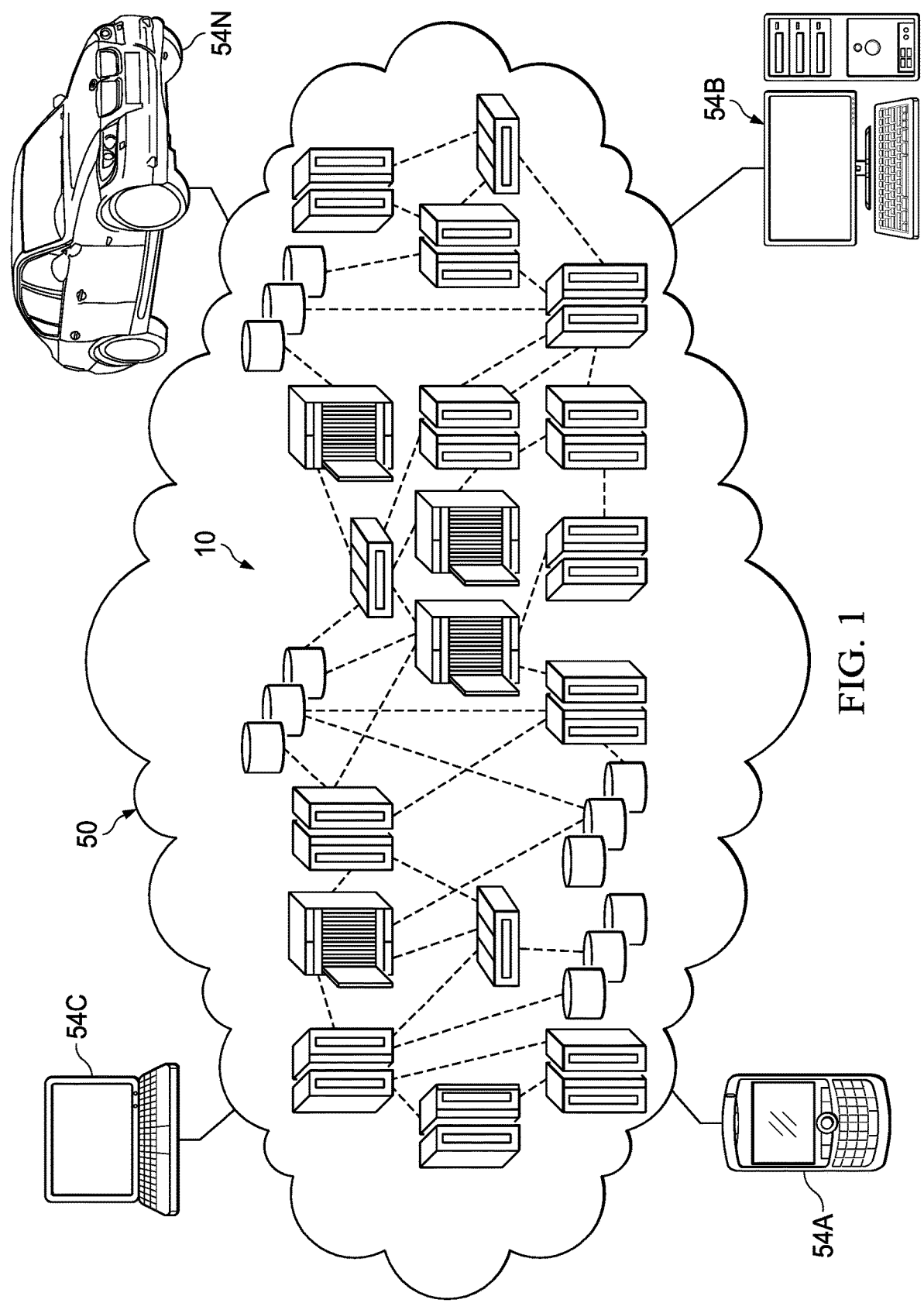
FIG. 1 depicts a cloud computing environment in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or some other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
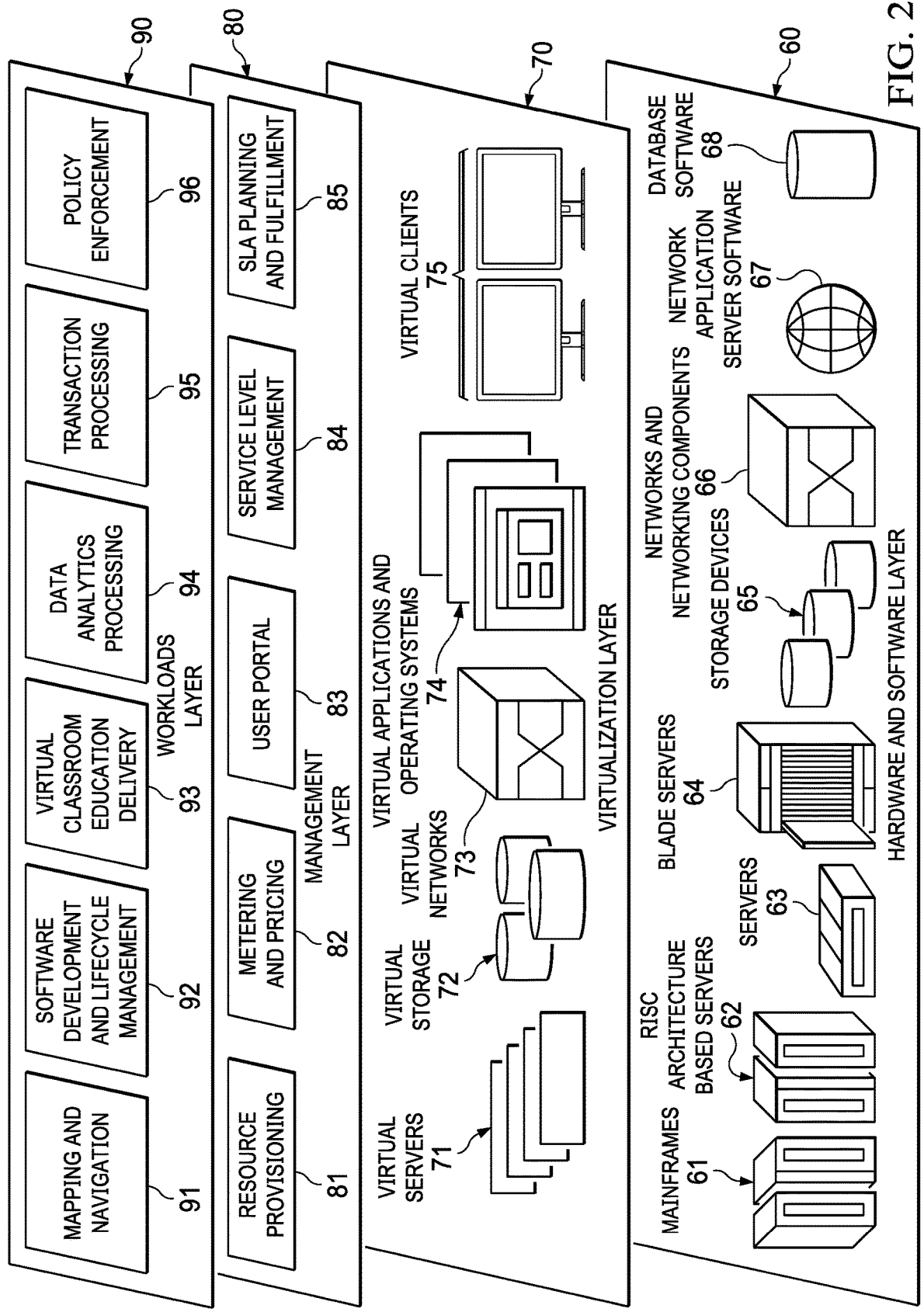
FIG. 2 depicts a set of functional abstraction layers in accordance with an illustrative embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and policy enforcement 96. Policy enforcement 96 provides a service for applying policies to data assets that are located in cloud computing environment 50 in FIG. 1.

The illustrative embodiments recognize and take into account one or more different considerations. For example, the illustrative embodiments recognize and take into account that determining whether to provide access to an information asset can take more time than desired when many policies are present for evaluation with respect to large numbers of information assets. Further, the illustrative embodiments recognize and take into account that as the number of rules increases with the use of additional policies, the time needed to evaluate the rules increases. For example, the illustrative embodiments recognize and take into account that evaluating ten rules with respect to an information asset utilizes fewer computing resources and time as compared to evaluating 70,000 rules. The illustrative embodiments recognize and take into account that large numbers of policies typically involve large numbers of rules.

The illustrative embodiments also recognize and take into account that, in addition to the number of policies, the dichotomy of policy types for enforcement can be very large within a computer system. For example, the policy types can include policies relating to access to information assets, retention or lifecycle of information assets, classification of information assets, or other suitable types of policies.

Thus, with a number of policies that can be present for enforcement and the different types of policies, the illustrative embodiments also recognize and take into account that the distributed nature of a computer system can also make enforcement more difficult and time-consuming. For example, the illustrative embodiments recognize and take into account that having distributed points for enforcing policies can make updating policies used by those enforcement points more time-consuming and resource-intensive as well as cause accuracy issues in enforcement when policies change, information assets change, enforcement points change, or other changes occur within a computer system in which active enforcement of policies is desired.

The illustrative embodiments recognize and take into account that the rules in the policies can have large numbers of predicates that combine conditions associated with data in a computer system, such as a cloud environment. Further, the illustrative embodiments recognize and take into account that many users can request access to data in the computer system. As the number of users requesting access to data information assets increase, the performance in evaluating information assets with policies can decrease with increasing response times.

Further, the illustrative embodiments recognize and take into account that rules can be changed, added, and removed. As a result, the illustrative embodiments recognize and take into account that accuracy in policy decisions can be reduced.

The illustrative embodiments recognize and take into account that many organizations resort to partitioning information assets in a data dimension. The illustrative embodiments recognize and take into account that this technique can apply policies to discrete disjoint partitions of information assets, reducing the quantity or rule processing possible for decision making in enforcing policies.

Therefore, it would be desirable to have a method, apparatus, system, and computer program product that take into account at least some of the issues discussed above, as well as other possible issues. For example, it would be desirable to have a method and apparatus that overcome at least one of the computer resources or time needed to evaluate policies in a computer system when access to information assets are requested by users.

Thus, the illustrative embodiments provide a method, apparatus, system, and computer program product for evaluating an information asset with a policy. In the illustrative example, the chief data officer (CDO) can author policies that include one or more enforceable rules. The CDO or other person can also, add, remove, or modify rules or policies. Access to information assets are evaluated using all active policies to determine whether access is allowed when access is requested with a particular context. The context can include an identification of a user and information about the connection employed by the user.

In one illustrative example, rules in the policy are identified by a computer system. A set of common subexpressions between the rules is identified by the computer system in the policy. Metadata for the information asset is applied by the computer system to the set of common subexpressions to form partially evaluated rules for the policy. The partially evaluated rules are stored by the computer system in association with the information asset. The partially evaluated rules are a compressed form of the rules for the policy, and reduce computer resources used to evaluate the information asset with the policy. These partially evaluated rules can then be used to evaluate an information asset at the time when other information needed to evaluate the information asset with people is present, such as user context.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustrative embodiments provide a method, apparatus, system, and computer program product for enforcing policies in a computer system. In one illustrative example, the policy can be evaluated with respect to an information asset as part of enforcing a policy in a computer system. Rules in the policy are identified. A set of common subexpressions between the rules in the policy is applied. Metadata for the information asset is applied to the set of common subexpressions to form partially evaluated rules for the policy. The partially evaluated rules are stored in association with the information asset. The stored partially evaluated rules can be used at a later time when the rules are to be applied to an information asset. The partially evaluated rules are a compressed form of rules for the policy and reduce computer resources used to evaluate the information asset with respect to the policy.

Figure 3:
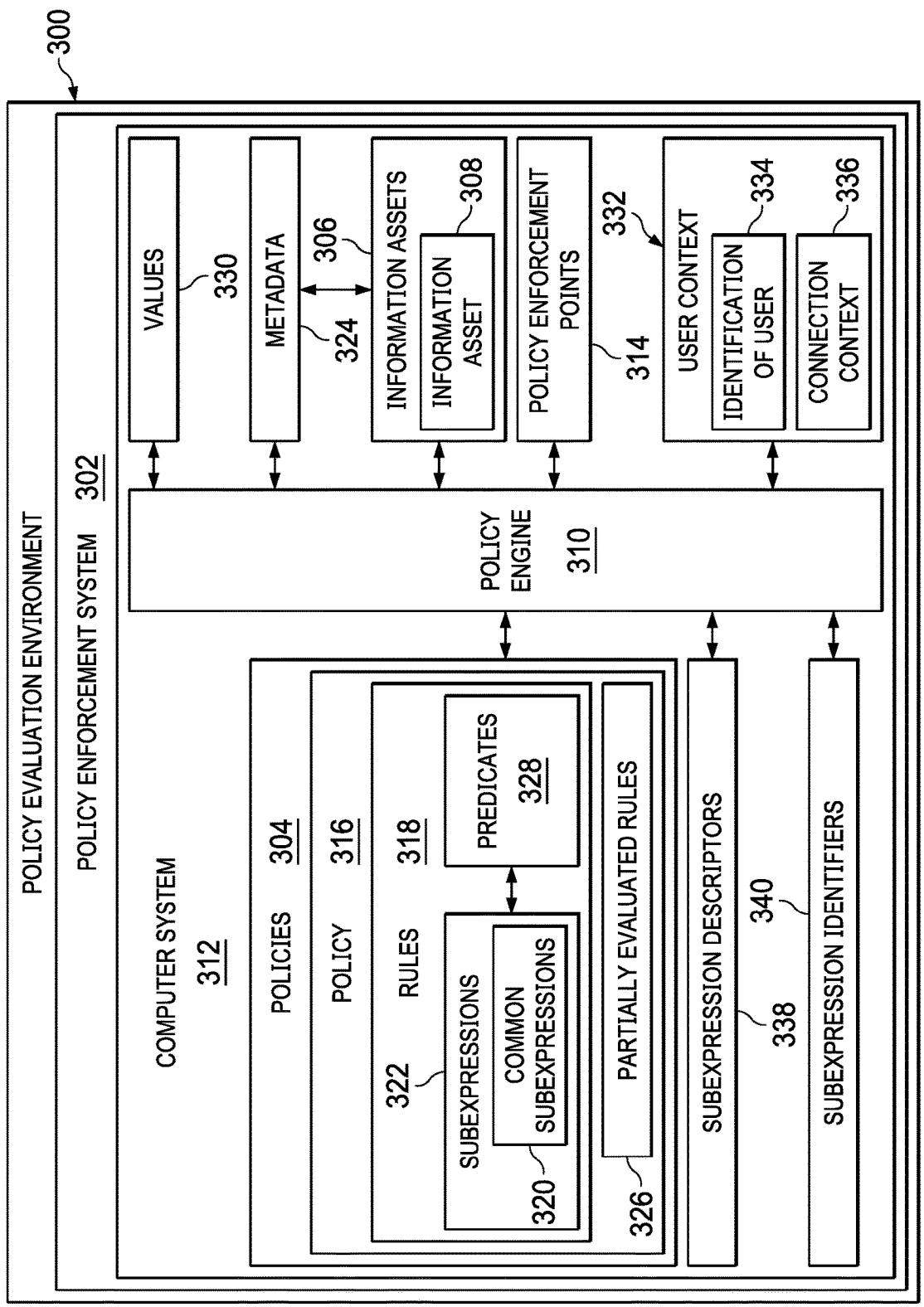
FIG. 3 is a block diagram illustrating a policy evaluation environment in accordance with an illustrative embodiment.

With reference next to FIG. 3, a block diagram of a policy evaluation environment is depicted in accordance with an illustrative embodiment. In this illustrative example, policy evaluation environment 300 is an environment in which policy enforcement system 302 enforces policies 304 with respect to information assets 306 can be evaluated using policies 304 in computer system 312. In this illustrative example, policy enforcement system 302 can be used to implement policy enforcement 96 in workloads layer 90 in FIG. 2 for cloud computing environment 50 in FIG. 1.

Information assets 306 can include information selected from at least one of user-defined information, system-generated information, metadata about an information asset, a pointer to actual data stored in a database or a file system, or other suitable types of information. In this illustrative example, information assets 306 comprise at least one of data or metadata describing the data. For example, information asset 308 in information assets 306 is a grouping of a number of data sets and related metadata about the number of data sets. As used herein, "a number of," when used with reference to items, means one or more items. For example, "a number of different types of data sets" is one or more of different types of data sets. A data set is a collection of related sets of information that is composed of separate elements.

For example, information asset 308 can comprise or include a data set in the form of a customer table in a database. Information asset 308 also can include a catalog that points to the customer table with a name "X Product Customer Data". This catalog can also contain metadata selected from at least one of a tag associated with information asset 308, a type of data present in a column of the customer table, or other suitable information describing the table in information asset 308. In other illustrative examples, information asset 308 can be a database, a collection of files, or other suitable information.

In this illustrative example, policy enforcement system 302 comprises policy engine 310 in computer system 312. Policy enforcement system 302 can optionally include a number of policy enforcement points 314 in computer system 312.

At least one of policy engine 310 or the number of policy enforcement points 314 can be implemented in software, hardware, firmware, or a combination thereof. When software is used, the operations performed by at least one of policy engine 310 or the number of policy enforcement points 314 can be implemented in program code configured to run on hardware, such as a processor unit. When firmware is used, the operations performed by at least one of policy engine 310 or the number of policy enforcement points 314 can be implemented in program code and data and stored in persistent memory to run on a processor unit. When hardware is employed, the hardware may include circuits that operate to perform the operations in at least one of policy engine 310 or the number of policy enforcement points 314.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 312 is a physical hardware system and includes one or more data processing systems. When more than one data processing system is present in computer system 312, those data processing systems are in communication with each other using a communications medium. The communications medium can be a network. The data processing systems can be selected from at least one of a computer, a server computer, a tablet computer, or some other suitable data processing system.

In this illustrative example, computer system 312 with policy engine 310 enforces organizational policies on information asset 308 in information assets 306 with policy 316 in policies 304. As depicted, policy engine 310 identifies rules 318 in the active ones of policies 304 in computer system 312. Policy engine 310 also identifies a set of common subexpressions 320 between rules 318 in policy 316.

As used herein, a "set of," when used with reference to items, means one or more items. For example, "a set of common subexpressions 320" is one or more of subexpressions 322 for rules 318 that are the same in two or more of rules 318.

A subexpression is a portion of a rule. For example, a subexpression can be two predicates joined by a conjunction. In this illustrative example, the conjunction is a Boolean operator such as "and" or "or". For example, with the following rule "if Asset.Tag='sensitive' and Context.UserName='x' and Context.UserGroups contains 'viewers', then deny", the following: "If Asset.Tag='sensitive' and Context.UserName='x'" is an example of a subexpression for the rule. In the illustrative example, a predicate is a statement that can be true or false. For example, "Asset.Tag='sensitive'" is a statement that can be true or false. If the metadata for Asset.Tag is "sensitive", then the statement is true. If the metadata for Asset.Tag is not "sensitive", then the statement is false.

The set of common subexpressions 320 is one or more of subexpressions 322 that are found in multiple rules in rules 318 in policy 316. For example, Rule 1 is "if Asset.Loc='US' and Asset.Type='HR' and Asset.Tag='sensitive' and Context.Location='US', then allow" and Rule 2 is "if Asset.Loc='US' and Asset.Type='HR' and User.Name='x' and Context.Location='US', then allow". Rule 1 and Rule 2 have a common subexpression. The common subexpression in Rule 1 and Rule 2 is "Asset.Loc='US' and Asset.Type='HR'". This subexpression is present in each rule and is therefore a common subexpression.

In this illustrative example, identification of the set of common subexpressions 320 can be used to perform at least one of preprocessing or compressing of rules 318 for policy 316. In this illustrative example, policy engine 310 applies metadata 324 for information asset 308 to the set of common subexpressions 320 to form partially evaluated rules 326 for policy 316. In this illustrative example, metadata 324 is information about information asset 308. The information in metadata 324 can include, for example, values for variables in the predicates. For a given asset, in the illustrative example as described, for Rule 1 and Rule 2, Asset.Loc and Asset.Type will be known and partially evaluated in the rules. Two variants of the rule are present in this example. The first variant in Rule 1: TRUE and Context.Location='US' and the second variant in Rule 1: FALSE and Context.Location='US' that will be simplified to R1: FALSE (does not apply for the given asset).

Policy engine 310 can compress a rule from rules 318 when an evaluated common subexpression in the rule causes the rule to have a decision. For example, the decision can be to allow access, deny access, or transform data. This decision can be used in place of the rule to compress the rule and reduce processing at a later time. For example, a rule can be removed if the result of applying metadata 324 to the set of common subexpressions 320 for the rule indicates that the rule is inapplicable.

For example, metadata for information asset 308 can include an identification of an asset type as "Financial". This value for the asset type can be applied to evaluate a common subexpression for Rule 1 and Rule 2, if Asset.Loc='US' and Asset.Type='HR'". In this case, Asset.Type='HR' is false. As a result, the pre-evaluation of the common subexpression for Rule 1 and Rule 2 is false. As a result, this rule can be to allow access as part of this pre-evaluation of rules 318 for information asset 306. A determination of "deny" for Rule 1 and Rule 2 does not occur because Asset.Type='HR' is false. In this case, the rules can be replaced with an action. For example, Rule 1 and Rule 2 can be replaced with the action "allow". In some illustrative examples, the rule can be removed if the rule become inapplicable. For example, if the rule requires two predicates to be true to perform an action and one of the predicates is false, then the rule is inapplicable in this example and can be removed.

Thus, policy engine 310 can perform at least one of replacing a rule from the rules with a policy decision when an evaluated subexpression in the rule causes the rule to have the policy decision, or removing the rule from the rules when the evaluated subexpression in the rule causes the rule to be inapplicable. In this example, the actions performed for the rule can compress the rule in policy 316.

The evaluation of common subexpressions 320 in rules 318 can be performed in a number of different ways. For example, policy engine 310 can identify a set of predicates 328 in the set of common subexpressions 320. Policy engine 310 can determine a set of values 330 for the set of predicates 328. Policy engine 310 can evaluate the set of common subexpressions 320 using values 330 for the set of predicates 328 to form partially evaluated rules 326.

In other words, policy engine 310 evaluates the set of predicates 328 in the set of common subexpressions 320 using metadata 324 for information asset 308 to obtain evaluated subexpressions. Policy engine 310 rewrites rules 318 using the evaluated subexpressions to form partially evaluated rules 326.

In this example, the set of predicates 328 in the set of common subexpressions 320 is evaluated by policy engine 310 using metadata 324 for information asset 308 to obtain evaluated subexpressions. Policy engine 310 rewrites rules 318 using evaluated subexpressions to form partially evaluated rules 326.

In this illustrative example, policy engine 310 stores partially evaluated rules 326 in association with information asset 308. The association can be formed using, for example, a pointer, an identifier, a table entry, or some other mechanism for associating data with each other. In this illustrative example, the set of partially evaluated rules 326 can be stored in a set of policy enforcement points 314 in computer system 312; in association with information asset 308 in a central location with policy engine 310; or some other suitable location in computer system 312. Partially evaluated rules 326 are a compressed form of rules 318 for policy 316 that reduce the amount of computer resources used to evaluate information asset 308 with policy 316.

This processing of a set of common subexpressions 320 for information asset 308 can be referred to as a parallel evaluation of rules 318. As depicted, the set of common subexpressions 320 can be identified and evaluated in parallel. With applying metadata 324 to the set of common subexpressions 320 in rules 318 in policy 316, the results, such as values referred for predicates 328 in a set of common subexpressions 320, can be placed into rules 318 to form partially evaluated rules 326. In some cases, values may be present to reduce the need for further evaluation when policy 316 is to be enforced against information asset 308. In other cases, entire rules in rules 318 can be eliminated based on values 330 identified for predicates 328 in common subexpressions 320 for rules 318.

Additionally, efficiencies in later evaluation of information asset 308 using policy 316 can be obtained from identification of the set of common subexpressions 320. Further, a set of subexpression descriptors 338 can be defined for the set of common subexpressions 320. The set of common subexpressions 320 in rules 318 can be replaced with subexpression identifiers 340.

A subexpression descriptor in the set of subexpression descriptors 338 contains a common subexpression and a subexpression identifier. These subexpression identifiers are selected to have a shorter length or size as compared to the set of common subexpressions 320 in the set of subexpression descriptors 338. For example, the subexpression "Asset.Loc='US' and Asset.Type='HR'" can be a policy descriptor and can be identified with a policy descriptor identifier "PD1".

In other words, the subexpression descriptor is a common subexpression in this illustrative example. Each of rules 318 with this common subexpression can have the common subexpression replaced with the subexpression identifier, thus reducing the amount of space needed to store rules 318 or partially evaluated rules 326.

The use of the set of subexpression identifiers 340 in place of the set of common subexpressions 320 can be used to compress at least one of rules 318 or partially evaluated rules 326. This compression can reduce the amount of storage space needed as part of reducing the use of computer resources in computer system 312.

As depicted, the set of subexpression descriptors 338 can be evaluated with metadata 324 such that values 330 identified for the set of predicates 328 in the set of subexpression descriptors 338 can be used to generate partially evaluated rules 326. This evaluation is performed on the set of subexpression descriptors 338 using those values to generate partially evaluated rules 326. This use of subexpression descriptors 338 can also reduce at least one of time or resource use in computer system 312.

At a later time, after generating partially evaluated rules 326 for policy 316, computer system 312 can evaluate information asset 308 with policy 316 using partially evaluated rules 326 stored in association with information asset 308. A more complete evaluation of information asset 308 can be performed when additional information needed for the evaluation of information asset 308 is present at the time when policy 316 is to be enforced against information asset 308.

A policy descriptor can be applicable to more than one information asset. For example, the evaluation of the metadata for the two information assets can result in the same partially evaluated rules. In this case, the policy descriptor can be applicable to both information assets. As a result, one policy descriptor is used rather than two policy descriptors for the two information assets. With using a single policy descriptor for two information assets, resources needed to store policy descriptors and enforce policies is reduced. This reduction in computing resources increases the number of information assets that can be evaluated using the same policy descriptor.

For example, the evaluation can be performed when a request to access information asset 308 is present. When the request is made, other information such as user context 332 is known. User context 332 can include identification of user 334 and connection context 336. Connection context 336 is information about a connection, such as a connection of a user device, an output device, or some other device in which data from information asset 308 may flow. For example, the context information can include at least one of a physical location of the connection, a default location, a connection type, or other suitable information that provides context to the connection.

For example, policy engine 310 in computer system 312 can evaluate information asset 308 with the set of partially evaluated rules 326 for policy 316 when policy engine 310 receives a request to evaluate information asset 308 with policy 316. The request can be received from a policy enforcement point in the set of policy enforcement points 314. In another illustrative example, a policy enforcement point in the set of policy enforcement points 314 evaluate information asset 308 with the set of partially evaluated rules 326 for policy 316 when the policy enforcement point receives a request to enforce policy 316.

In the illustrative examples, the generation of partially evaluated rules 326 for information asset 308 can be repeated when needed to ensure that partially evaluated rules 326 are up-to-date and accurate. For example, the generation of partially evaluated rules 326 can be performed when at least one of a set of rules 318 in policy 316 changes, when information asset 308 changes, or when metadata 324 for information asset 308 changes.

In the illustrative example, the different steps described for generating partially evaluated rules 326 for policy 316 can be applied to every policy in policies 304. As a result, when policies 304 are enforced in computer system 312, the amount of computer resources needed to enforce those policies can be reduced because of the user of partially evaluated rules 326 in policy 304. Partially evaluated rules 326 reduce the amount of evaluation needed when enforcement of policy 304 is desired.

In one illustrative example, one or more solutions are present that overcome a problem with at least one of the amount of computer resources or time needed to enforce policies in a computer system when access to information assets are requested by users. As a result, in the illustrative example, one or more solutions enable enforcing policies with at least one of less time or use of computer resources. In the illustrative example, one or more solutions employ partially evaluated rules that are a compressed form of the rules for the policy such that the amount of computer resources used to evaluate the information asset with the policy or the amount of time needed to evaluate the information asset with the policy is reduced in computer system 312.

Computer system 312 can be configured to perform at least one of the steps, operations, or actions described in the different illustrative examples using software, hardware, firmware, or a combination thereof. As a result, computer system 312 operates as a special purpose computer system in which policy engine 310 in computer system 312 enables evaluating rules at a time such that partially evaluated rules can be generated. These partially evaluated rules can be used to evaluate an information asset when other information needed to evaluate the information asset is present. In particular, policy engine 310 transforms computer system 312 into a special purpose computer system as compared to currently available general computer systems that do not have policy engine 310.

In the illustrative example, the use of policy engine 310 in computer system 312 integrates processes into a practical application of a method for enforcing policies that increases the performance of computer system 312. In this illustrative example, the increase in the performance of computer system 312 can occur through a decrease in the amount of computer resources and time needed to enforce policies 304. Further, through the reduced use of computer resources to enforce policies, increased availability of computer resources is present for other processing needs. These processing needs can include, for example, responding to user requests or requests from other computer systems or computers outside of computer system 312.

In other words, policy engine 310 in computer system 312 is directed to a practical application of processes integrated into policy engine 310 in computer system 312 that identifies rules in a policy; identifies a set of common subexpressions between the rules in the policy; applies metadata for the information asset to the set of common subexpressions to form partially evaluated rules for the policy; and stores the partially evaluated rules in association with the information asset. The partially evaluated rules are a compressed form of the rules for the policy and reduce the amount of computer resources used to evaluate the information asset with the policy when the policy is to be enforced with respect to the information asset. In this manner, policy engine 310 in computer system 312 provides a practical application for enforcing policies in the computer system such that the functioning of computer system 312 is improved. For example, reduced use of computer resources occurs as well as increased availability of computer resources for other purposes other than enforcing policies in computer system 312.

Figure 4:
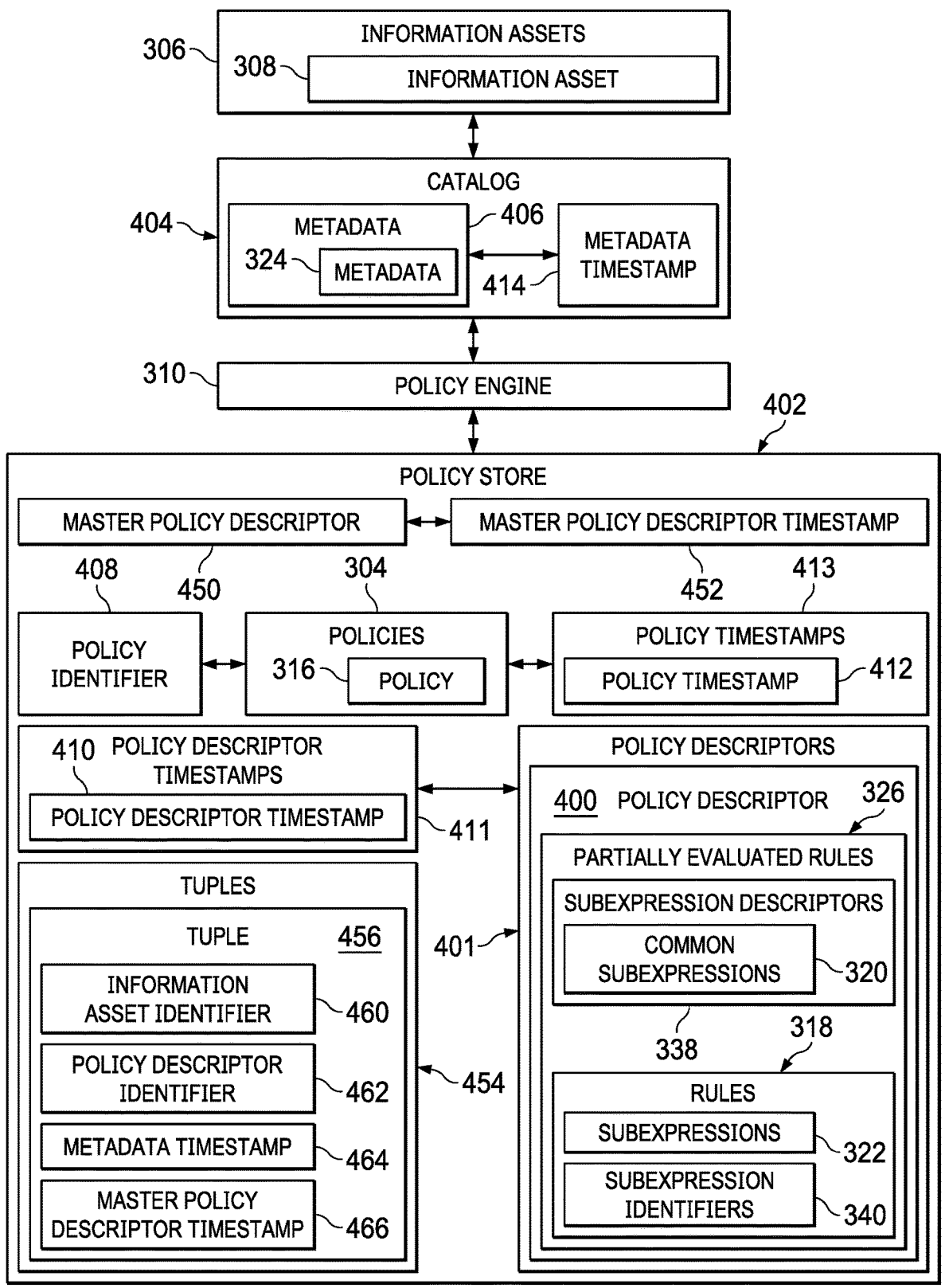
FIG. 4 is a block diagram illustrating a data flow of creating of a policy descriptor in accordance with an illustrative embodiment.

With reference next to FIG. 4, a block diagram illustrating a data flow of creating a policy descriptor is depicted in accordance with an illustrative embodiment. In the illustrative examples, the same reference numeral may be used in more than one figure. This reuse of a reference numeral in different figures represents the same element in the different figures.

In this illustrative example, policy engine 310 can create policy descriptor 400 in policy descriptors 401 for policy 316 in policies 304. In this illustrative example, policy descriptor 400 is specific for information asset 308. The policy descriptor for the information asset can also be referred to as an asset descriptor.

At least one of policy descriptor 400 or policy 316 can be stored in policy store 402. Policy store 402 is a storage system and can be in a single location or can be distributed in different locations.

In creating policy descriptor 400, policy engine 310 identifies common subexpressions 320 in rules 318. Policy engine 310 generates subexpression descriptors 338 for common subexpressions 320 in rules 318 for policy 316.

In this illustrative example, subexpression descriptors 338 are data structures that contain or represent common subexpressions 320. Common subexpressions 320 in rules 318 are replaced by subexpression identifiers 340.

As depicted, a subexpression descriptor in subexpression descriptors 338 can be used to represent the same common expression in at least one of rules 318 in policy 316 and in rules in other policies. In this illustrative example, a common subexpression found in rules in multiple policies in policies 304 can be referenced by the same policy descriptor or identifier used to refer to a single subexpression descriptor in subexpression descriptors 338 for the common subexpression in common subexpressions 320.

In this illustrative example, subexpression descriptors 338 are evaluated using metadata 324 for information assets 306. Policy engine 310 identifies metadata 324 for information asset 308 using catalog 404.

In this illustrative example, catalog 404 can be a table, a database, a container, or some other data structure that stores and organizes metadata 406 for information assets 306. In other words, catalog 404 can be used to identify metadata 406 that describes a particular information asset in information assets 306. Further, metadata 406 can also include pointers or links to information assets 306. For example, an identifier for information asset 308 can be used to locate metadata 324 for information asset 308 in catalog 404. The tracking of changes in metadata 406 includes tracking changes in the actual data of information asset 308. In the illustrative example, a change to actual data of information asset 308 will result in a change in metadata 324.

In this illustrative example, metadata 406 can be generated either by a human operator or by a software process. The human operator can manually input metadata 406. When software processes are used, processes such as data profiles, data extractors, or other processes can be used to identify and write metadata 406 into catalog 404.

Policy engine 310 then applies metadata 324 to subexpression descriptors 338. The application of metadata 324 can generate values 330 in FIG. 3 for a set of predicates 328 in FIG. 3 in common subexpressions 320 in subexpression descriptors 338.

With the application of metadata 324, some rules in policy 316 can be replaced with an indication of a policy decision such as allow access, deny access, or transform data in creating partially evaluated rules 326. When data is to be transformed, the rule can include an indication of the type of transformation. A transformation can be identified as the result of the rule. In these illustrative examples, a rule that is determined to be inapplicable based on the application of metadata to a policy descriptor or another subexpression in the rules can be replaced with the decision or the rule can be removed as part of creating partially evaluated rules 326.

Further, metadata 324 can be applied to other subexpressions in rules 318 in addition to common subexpressions 320 to generate subexpressions that are partially evaluated in which some predicates have values. This application of metadata 324 to subexpressions can reduce the amount of computer resources needed to evaluate information assets 306 to enforce policies 304.

Partially evaluated rules 326 can be placed into policy descriptor 400 and associated with policy identifier 408. In this illustrative example, policy descriptor 400 is associated with policy descriptor timestamp 410 in policy descriptor timestamps 411 that identifies when policy descriptor 400 is generated. In other words, each policy descriptor in policy descriptors 401 has a policy descriptor timestamp in policy descriptor timestamps 411.

Further, policies 304 have policy timestamps 413. For example, policy 316 has policy timestamp 412 that indicates when policy 316 was created or last modified. Metadata timestamp 414 can be associated with metadata 406. Metadata timestamp 414 indicates when metadata 324 was created or last modified.

In this illustrative example, master policy descriptor 450 is also generated and stored in policy store 402. Master policy descriptor 450 comprises the rules for all of policies 304. In other words, these rules in master policy descriptor 450 describe the rules for all of the policies 316 in computer system 312 in FIG. 3. In this illustrative example, each rule in master policy descriptor 450 is associated with more and more of policies 316. In other words, if a rule is present in more than one policy, that rule is associated with those policies rather than having the same rule present in each policy. As a result, the amount of storage space for policies 304 can be reduced through the use of master policy descriptor 450.

As depicted, master policy descriptor 450 has master policy descriptor timestamp 452 when stored in policy store 402. In the illustrative example, each policy descriptor for an information asset can be derived from the rules in master policy descriptor 450.

These timestamps can be used whenever a request is made to evaluate information asset 308 with respect to policy 316. If policy timestamp 412 or metadata timestamp 414 is different from policy descriptor timestamp 410, policy descriptor 400 may not be current and is considered to be out-of-date. In this situation, policy engine 310 repeats processing of rules 318 in policy 316 to generate an updated policy descriptor for use in evaluating information assets 306.

In this illustrative example, tuples 454 are also stored in policy store 402. Tuples 454 are used to identify which policy descriptors for policies 304 are to be enforced with respect to information assets 306.

For example, tuple 456 in tuples 454 contains information asset identifier 460 that identifies information asset 308; policy descriptor identifier 462 that identifies policy descriptor 400; metadata timestamp 464 for metadata 324; and master policy descriptor timestamp 466 for master policy descriptor 450. When enforcement of information asset 308 is to be performed, tuple 456 for information asset 308 is used to compare metadata timestamp 464 in tuple 456 with metadata timestamp 414 for metadata 324 for information asset 308.

Metadata timestamp 464 and master policy descriptor timestamp 466 in tuple 456 are the timestamps present for metadata 324 and master policy descriptor 450 when policy descriptor 400 is created. Thus, if metadata 324 is updated, metadata timestamp 414 change. As are result, metadata timestamp 414 will no longer match metadata timestamp 464 stored in tuple 456. In similar fashion, if master policy descriptor 450 changes, master policy descriptor timestamp 452 will be updated and that timestamp will no longer match master policy descriptor timestamp 466 stored in tuple 456.

For example, when policy descriptor 400 is to be enforced, tuple 456 is to compare master policy descriptor timestamp 466 in tuple 456 with master policy descriptor timestamp 452 for master policy descriptor 450. Additionally, metadata timestamp 464 is present in tuple 456 with metadata timestamp 414 for metadata 406. If the comparisons of timestamps result in a difference being present between the timestamps, policy descriptor 400 is recreated such that policy descriptor 400 takes into account any changes in at least one of metadata 324 or master policy descriptor 450.

Figure 5:
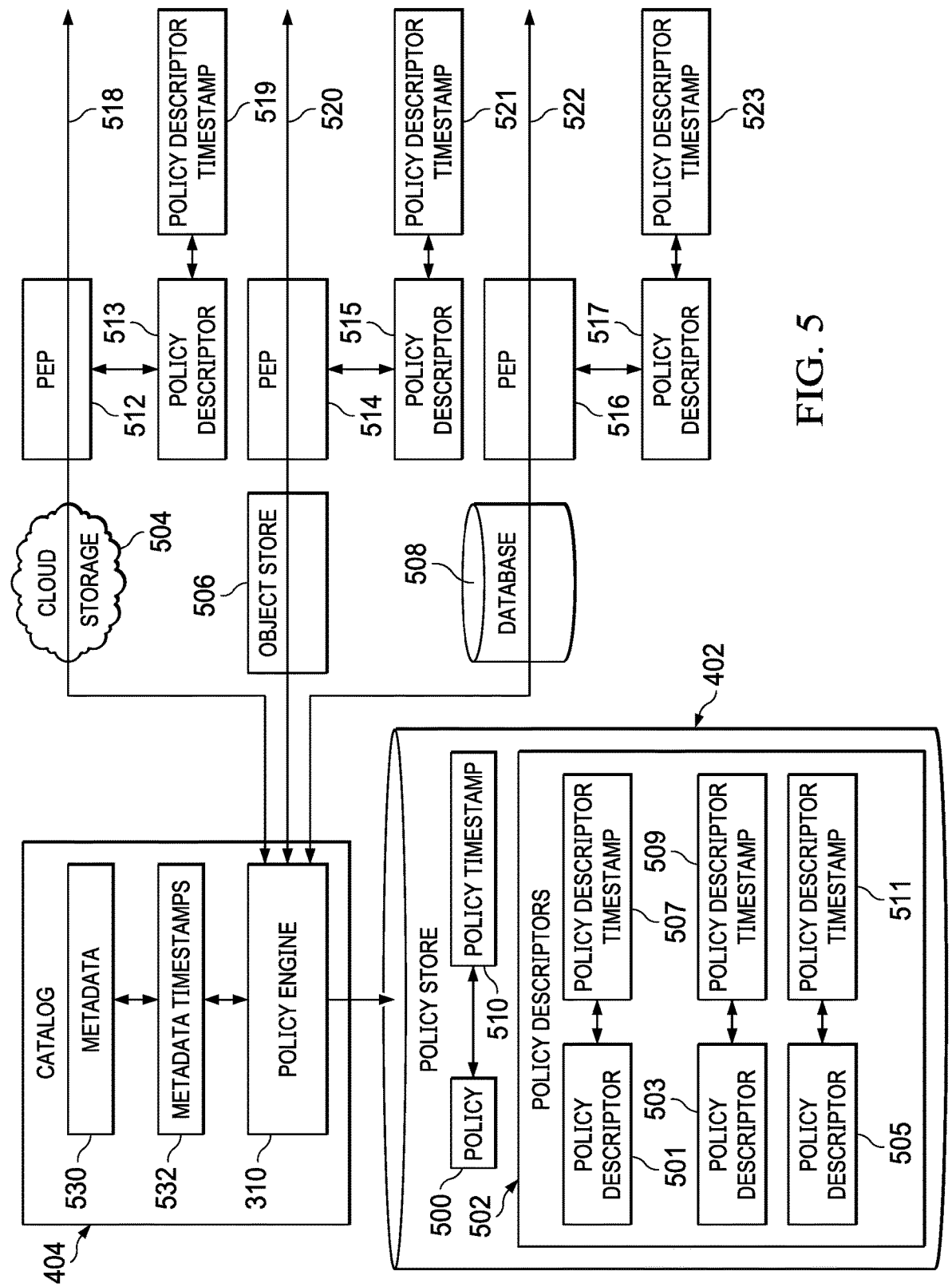
FIG. 5 is a block diagram illustrating a distribution of policy descriptors for policies in a computer system in accordance with an illustrative embodiment.

With reference next FIG. 5, a block diagram illustrating a distribution of policy descriptors for policies in a computer system is depicted in accordance with an illustrative embodiment. In this depicted example, policy descriptors can be distributed within a computer system for increasing scalability in enforcing policies and increasing throughput for data access from information assets.

In this illustrative example, policy 500 and policy descriptors 502 are located in policy store 402. In this illustrative example, policy descriptors 502 are partially evaluated rules created from policy 500 for different information assets. In this illustrative example, policy descriptor 501 is created from policy 500 for cloud storage 504; policy descriptor 503 is created from policy 500 for object store 506; and policy descriptor 505 is created from policy 500 for database 508.

As depicted, policy 500 has policy timestamp 510. Policy timestamp 510 indicates either when policy 500 was created or the last time policy 500 was changed. In this illustrative example, policy descriptor 501 has policy descriptor timestamp 507; policy descriptor 503 has policy descriptor timestamp 509; and policy descriptor 505 has policy descriptor timestamp 511.

In this illustrative example, these timestamps can be used as version identifiers to determine whether policy descriptors 502 are current with respect to policy 500. If one of policy descriptors 502 has a timestamp that is earlier than policy timestamp 510, that policy descriptor is not a correct version for use in evaluating an information asset. In this case, a new policy descriptor can be created from policy 500 to generate a current policy descriptor for use in evaluating the information asset.

Policy descriptors 502 can be distributed for enforcement of policy 500. As depicted, policy descriptors 502 are distributed to policy enforcement points, such as policy enforcement point (PEP) 512, policy enforcement point (PEP) 514, and policy enforcement point (PEP) 516. Policy enforcement point 512 is located on data access path 518; policy enforcement point 514 is located on data access path 520; and policy enforcement point 516 is located on data access path 522. A data access path is in a computer system through which data flows from an information asset. The data moves on a data access path to an endpoint such as a computing device for a user requesting data from the data asset. Each data access path can have a specific user context based on the user information about the connection.

As depicted, policy descriptor 513 is located at policy enforcement point 512; policy descriptor 515 is located at policy enforcement point 514; and policy descriptor 517 is located at policy enforcement point 516. In this illustrative example, policy descriptor 513 is an instance of policy descriptor 501; policy descriptor 515 is an instance of policy descriptor 503; and policy descriptor 517 is an instance of policy descriptor 505. These instances of policy descriptors 502 should be derived from policy 500 that has been created for a particular information asset. In some cases, an update to a policy descriptor in policy store 402 may not be propagated to a policy enforcement point at the time when the policy is to be enforced with respect to an information asset.

In the illustrative example, policy descriptor 513 has policy descriptor timestamp 519; policy descriptor 515 has policy descriptor timestamp 521; and policy descriptor 517 has policy descriptor timestamp 523. These timestamps can be compared to the timestamps for corresponding policy descriptors in policy descriptors 502 located in policy store 402. These timestamps can be used to determine whether a change has occurred in a policy since the time at which the policy descriptor was created.

In the illustrative example, evaluations of information assets can also be made by at least one of policy enforcement points or policy engine 310. When a policy enforcement point performs evaluation of an information asset to enforce policy 500, the policy enforcement point can request timestamp information from policy engine 310 when the policy enforcement point in which enforcement of policy 500 should be made with respect to the information asset. In other illustrative examples, the policy enforcement point can send the timestamp or the instance of the policy descriptor located at the policy enforcement point to policy engine 310. In this case, policy engine 310 can compare timestamps to determine whether the policy enforcement point is the correct version of the policy descriptor for use in enforcing policy 500. Policy engine 310 can return a response indicating whether the policy descriptor is the correct version for use in evaluating the information asset with policy 500 using the policy descriptor.

In this illustrative example, metadata 530, stored in catalog 404, is metadata for the information assets such as cloud storage 504, object store 506, and database 508. Metadata timestamps 532 are associated with metadata 530. A metadata timestamp in metadata timestamps 532 is associated with the metadata for each of the information assets. Metadata timestamps 532 can also be used to determine whether policy descriptors 502 in policy store 402 or the policy descriptors at the policy enforcement points are current.

For example, a comparison of the policy descriptor timestamps for policy descriptors 502 in policy store 402 and the policy enforcement points with policy timestamp 510 for policy 500 can indicate that policy descriptors are up-to-date. Further, a comparison of the policy descriptor timestamps for policy descriptors 502 with metadata timestamps 532 may indicate that one or more of policy descriptors 502 may be out-of-date because of a change in metadata 530 for a particular information asset. In this case, the policy descriptor for that information asset can be retrieved using the current metadata for the information asset in metadata 530.

In other illustrative examples, a policy descriptor may only be located in policy store 402 without being distributed to the locations of the policy enforcement points. In this case, the policy enforcement points can send a request to evaluate information assets that the policy enforcement points are associated with to obtain a policy determination for enforcement. In this example, the policy enforcement points can send an asset identifier to policy engine 310 to identify an information asset for which enforcement of policies is desired. The information asset identifier can be used to determine what policy descriptors are to be used to evaluate a particular information asset. A policy determination can be, for example, to allow access, to deny access, or to transform or modify data that is accessed.

Figure 6:
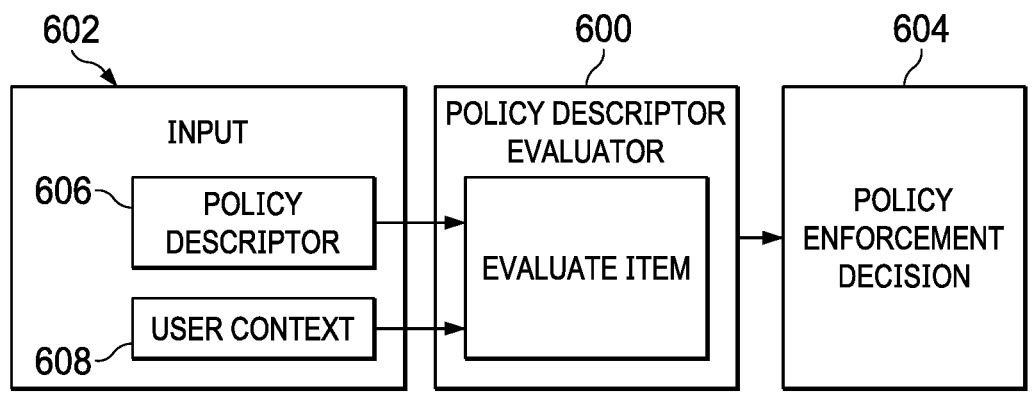
FIG. 6 is a block diagram of a data flow for evaluating information assets with a policy descriptor in accordance with an illustrative embodiment.

Turning next to FIG. 6, a block diagram of a data flow for evaluating information assets with a policy descriptor is depicted in accordance with an illustrative embodiment. In this illustrative example, policy descriptor evaluator 600 is a process that can be implemented in policy engine 310 in FIGS. 3-5 to evaluate an information asset with a policy.

As depicted, policy descriptor evaluator 600 receives input 602 and generates policy enforcement decision 604. In this illustrative example, input 602 comprises policy descriptor 606 and user context 608. Policy descriptor 606 comprises partially evaluated rules for a policy such as partially evaluated rules 326 in policy descriptor 400 shown in FIG. 4. User context 608 is additional information available for use in processing rules in policy descriptor 606 for determining policy enforcement decision 604. In the illustrative example, user context 608 is not available until a request for access to an information asset is made. User context 608 can change over time in the illustrative examples. User context 608 can include information such as identification of user 334 and connection context 336 in FIG. 3. Policy enforcement decision 604 can be, for example, to allow access, to deny access, or to transform data.

Figure 7:
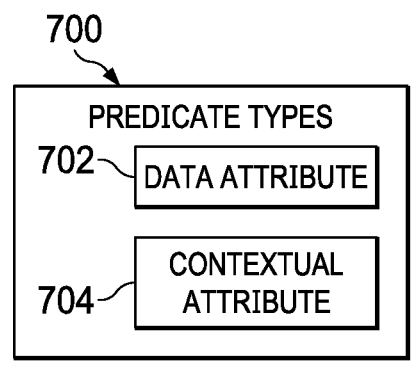
FIG. 7 is a block diagram of predicate types in accordance with an illustrative embodiment.

In FIG. 7, a block diagram of predicate types is depicted in accordance with an illustrative embodiment. In this illustrative example, predicate types 700 are types of predicates that can be present for predicates 328 in FIG. 3. As depicted, predicate types 700 include data attribute 702 and contextual attribute 704. In this illustrative example, data attribute 702 is predicated upon metadata values for an information asset. In this example, data attribute 702 can be an asset time, an asset modification date, an asset class, or other suitable metadata such as indicated with respect to metadata 406 and metadata timestamps 414. Contextual attribute 704 is predicated on contextual values that arrive in the request to evaluate the information asset. Contextual attribute 704 can be, for example, a user location, a time of day, a connection type, or other contextual information. In this illustrative example, predicates 328 having a predicate type of data attribute 702 can be evaluated prior to the request for evaluation of the information asset to form partially evaluated rules. Predicates 328 having a predicate type of contextual attribute 704 are remaining predicates that are evaluated when a request for an evaluation of an information asset is received.

The illustrations of policy evaluation environment in FIGS. 3-7 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the different steps performed by policy engine 310 have been described with respect to a single policy, policy 316, in policies 304 in FIG. 3. Other illustrative examples can form the same operations to generate partially evaluated rules for other policies in policies 304. As a result, reduction in at least one of time or resource use in computer system 312 is increased immensely as a number of policies 304 increases. For example, evaluating thousands of policies with thousands of enforceable rules against millions of information assets can be extremely time-consuming and resource-intensive in computer system 312.

As another example, the use of subexpression descriptors 338 and subexpression identifier 340 in FIG. 3 as part of the process in generating partially evaluated rules 326 is an optional feature. In some illustrative examples, common subexpressions 320 can be evaluated with a set of common subexpressions 320 remaining in rules 318. Replacing common subexpressions 320 with subexpression identifiers 340 that refer to subexpression descriptors 338 in which common subexpressions 320 in subexpression descriptors 338 are evaluated using metadata 324 can be omitted.

In another example, master policy descriptor 450 in FIG. 4 can be omitted. Policies 304 in FIGS. 3-4 can be stored with policy timestamps 413 in FIG. 4 with policy descriptors 502 in FIG. 5.

Figure 8:
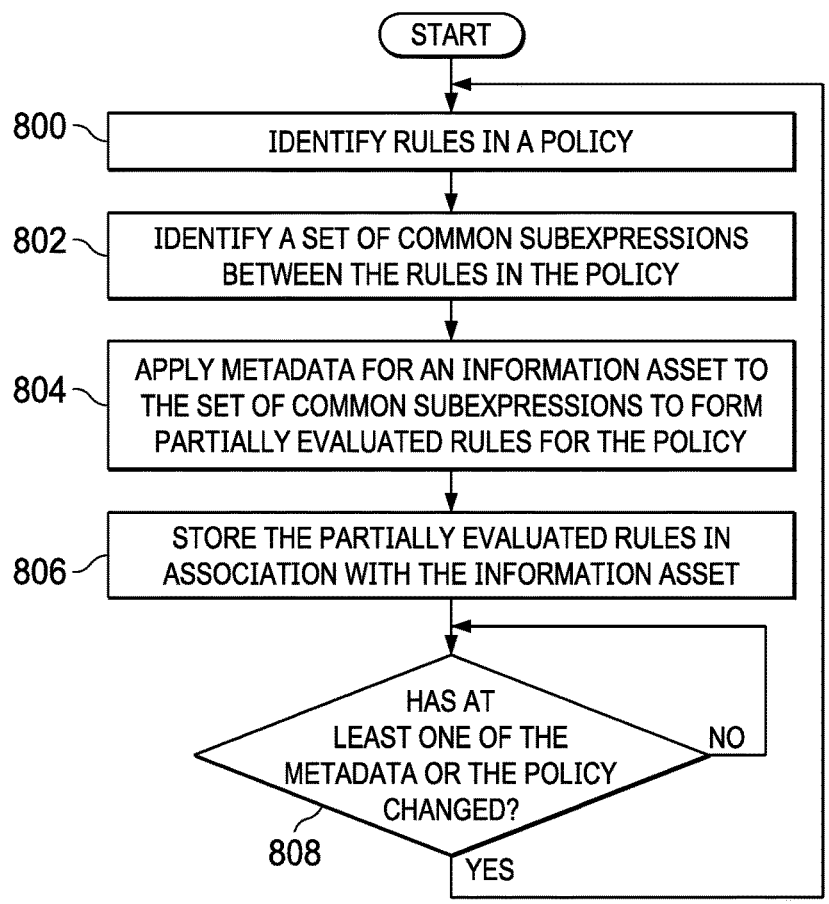
FIG. 8 is a flowchart of a process for evaluating an information asset with a policy in accordance with an illustrative embodiment.

Turning next to FIG. 8, a flowchart of a process for evaluating an information asset with a policy is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in policy engine 310 in computer system 312 in FIG. 3.

The process begins by identifying rules in a policy (step 800). In step 800, the policy is an active policy that is to be enforced. A chief data officer (CDO) for an organization can add policies, remove policies, and designate which policies are active in a computer system.

The process identifies a set of common subexpressions between the rules in the policy (step 802). The process applies metadata for an information asset to the set of common subexpressions to form partially evaluated rules for the policy (step 804).

The process stores the partially evaluated rules in association with the information asset (step 806). The partially evaluated rules are a compressed form of the rules for the policy, and reduce the amount of computer resources used to evaluate the information asset with the policy.

In this example, a determination is made as to whether at least one of the metadata has changed or the policy has changed (step 808). In step 808, the determination can be made by comparing timestamps for the metadata and the master policy descriptor with timestamps for the metadata and the master policy descriptor saved in a tuple for the policy descriptor. If at least one of the metadata has changed or the policy has changed, the process returns to step 800. Otherwise, the process returns to step 808. In this manner, the process can continually process the rules in a policy to create updated policy descriptors as needed to enforce policies in a computer system.

Thus, the process in FIG. 8 can be repeated as needed to make sure the partially evaluated rules in the policy descriptor are up-to-date. This process can be reinitiated if the metadata for the information asset changes, if the information asset itself changes, or if the policy changes. In other examples, step 800 and step 802 can be used to identify rules for all of the active policies. These rules form a master policy descriptor, describing the rules for all of the active policies in the computer system. Thus, step 800 can be performed to verify all rules for an information asset using a master policy descriptor for the information asset. Further, this process can be performed for other information assets in a catalog in the computer system. In this manner, policies can be enforced for assets in the computer system on a dynamic and continuous basis.

Figure 9:
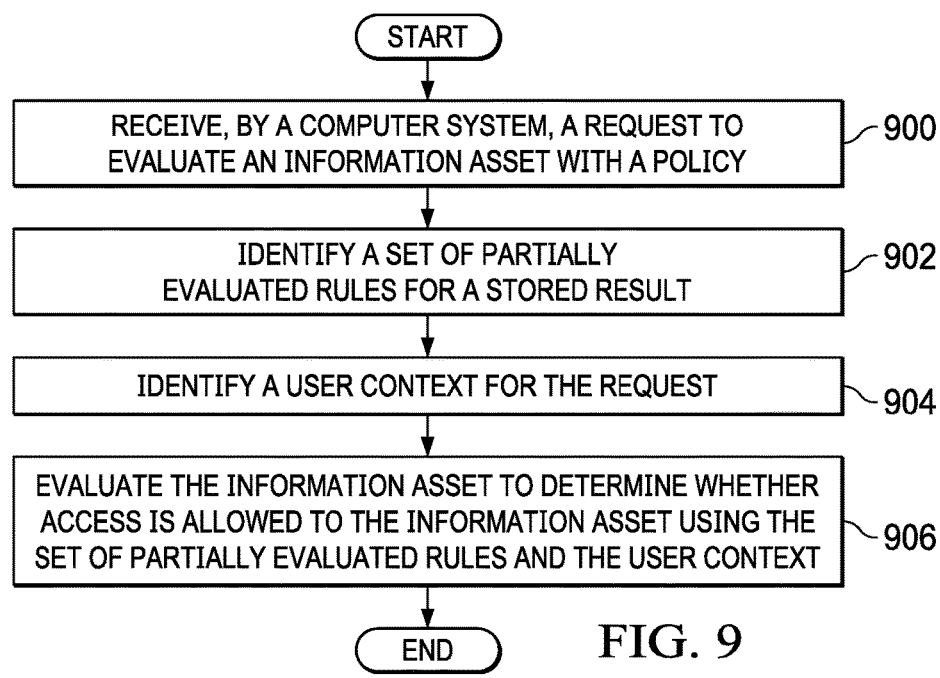
FIG. 9 is another flowchart of a process for evaluating an information asset in accordance with an illustrative embodiment.

Turning now to FIG. 9, another flowchart of a process for evaluating an information asset is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in policy engine 310 in computer system 312 in FIG. 3. The process in this flowchart can utilize the partially evaluated rules generated in FIG. 8.

The process begins by receiving, by a computer system, a request to evaluate an information asset with a policy (step 900). In step 900, the policy that is used in the evaluation is an active policy. In this illustrative example, the request can be received from a policy enforcement point for enforcement of a policy, a request to access data in the information asset, or some other type of request. The policy can be used to determine a policy decision such as access is allowed, access is denied, or transform data.

The process identifies the set of partially evaluated rules for a stored result (step 902). The association between the partially evaluated rules for an information asset can be made using a unique identifier, a table, a database, a pointer, a universal resource locator, or some other construct that associates items to each other. The identification of the information asset can be used to search for policies with the partially evaluated rules to enforce against the information asset. The information asset can be identified using an information asset identifier assigned to the information asset that uniquely identifies the information asset from other information assets. The information asset identified can be stored in catalog 404 in FIGS. 4-5.

The process identifies a user context for the request (step 904). The process evaluates the information asset to determine whether access is allowed to the information asset using the set of partially evaluated rules and the user context (step 906). The process terminates thereafter. Step 906 can also use information to evaluate the information assets with the policy containing the partially evaluated rules. For example, step 906 can also use metadata or some other information that may not have been available when the partially evaluated rules were created.

Figure 10:
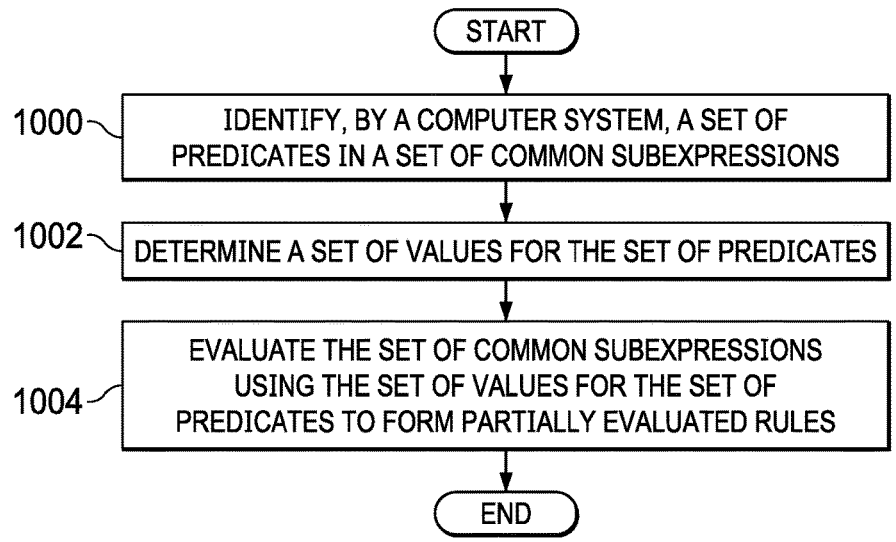
FIG. 10 is a flowchart of a process for applying metadata for an information asset to a set of common subexpressions to form partially evaluated rules for a policy in accordance with an illustrative embodiment.

Turning next to FIG. 10, a flowchart of a process for applying metadata for an information asset to a set of common subexpressions to form partially evaluated rules for a policy is depicted in accordance with an illustrative embodiment. The process in FIG. 10 is an example of an implementation for step 804 in FIG. 8.

The process beings by identifying, by a computer system, a set of predicates in a set of common subexpressions (step 1000). The process determines a set of values for the set of predicates (step 1002). The process evaluates the set of common subexpressions using the set of values for the set of predicates to form partially evaluated rules (step 1004). The process terminates thereafter.

Figure 11:
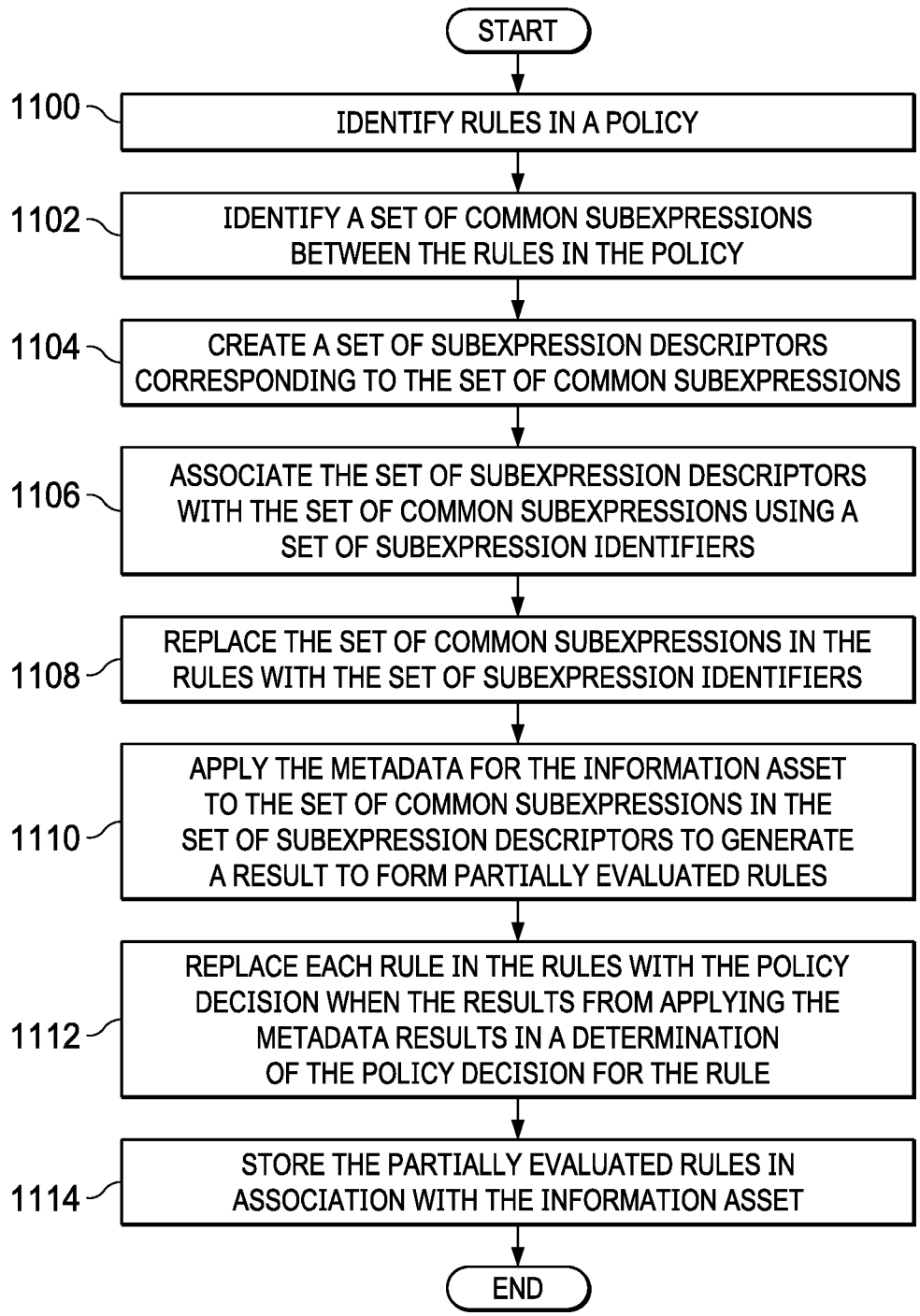
FIG. 11 is another flowchart of a process for evaluating an information asset in accordance with an illustrative embodiment.

With reference next to FIG. 11, a flowchart of a process for evaluating an information asset is depicted in accordance with an illustrative embodiment. The process in FIG. 11 can be implemented in hardware, software, or both. When implemented in software, the process can take the form of program code that is run by one of more processor units located in one or more hardware devices in one or more computer systems. For example, the process can be implemented in policy engine 310 in computer system 312 in FIG. 3. The process in this flowchart can compress rules as well as create partially evaluated rules.

The process begins by identifying rules in a policy (step 1100). In this example, the policy is an active policy that is to be enforced. The process identifies a set of common subexpressions between the rules in the policy (step 1102). The process creates a set of subexpression descriptors corresponding to the set of common subexpressions (step 1104). The process associates the set of subexpression descriptors with the set of common subexpressions using a set of subexpression identifiers (step 1106). In step 1106, the identifiers are smaller in size than policy descriptors containing the common subexpressions.

The process replaces the set of common subexpressions in the rules with the set of subexpression identifiers (step 1108). Step 1108 results in compression of the rules in the policy.

The process applies the metadata for the information asset to the set of common subexpressions in the set of subexpression descriptors to generate a result to form partially evaluated rules (step 1110). Further, the process can also apply the metadata for the information asset to other subexpressions in the rules that are not common subexpressions. This application of the metadata to other subexpressions that are not common subexpressions can further reduce processing of resources that are needed for later enforcement of the policy.

The process replaces each rule in the rules with a policy decision when the results from applying the metadata results in a determination of the policy decision for the rule (step 1112). In this manner, a rule in the rules is replaced with a policy decision when the results from applying the metadata results in a determination of the policy decision for the rule.

The process stores the partially evaluated rules in association with the information asset (step 1114) with the process terminating thereafter.

In step 1114, the storing of the partially evaluated rules also includes the subexpression descriptors as processed using the metadata. These subexpression descriptors are now considered part of the partially evaluated rules. Thus, the partially evaluated rules are a compressed form of the rules for the policy and reduce computer resources used to evaluate the information asset with the policy.

Figure 12:
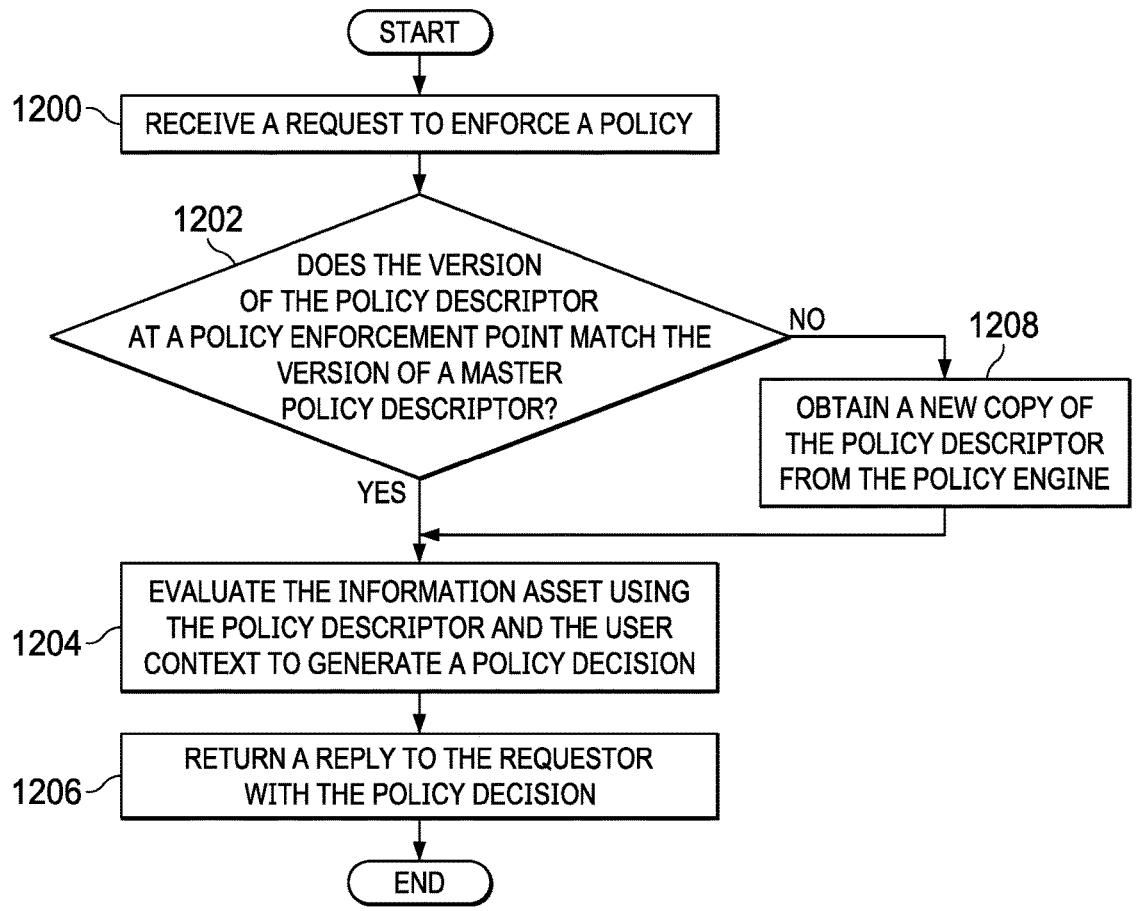
FIG. 12 is a flowchart of a process for evaluating an information asset at a policy enforcement point in accordance with an illustrative embodiment.

Turning next to FIG. 12, a flowchart of a process for evaluating an information asset at a policy enforcement point is depicted in accordance with an illustrative embodiment. The process in FIG. 12 can be implemented in hardware, software, or both. When implemented in software, the process can take the form of program code that is run by one of more processor units located in one or more hardware devices in one or more computer systems. For example, the process can be implemented in policy engine 310 in computer system 312 in FIG. 3. More particularly, the process can be implemented in policy descriptor evaluator 600 in FIG. 6 in policy engine 310.

The process begins by receiving a request to enforce a policy (step 1200). The request includes an input in the form of a policy descriptor and a user context. The process determines whether the version of the policy descriptor at a policy enforcement point matches the version of a master policy descriptor (step 1202). The master policy descriptor can be a copy of the policy descriptor that is located within a policy engine. The master policy descriptor can also be defined as the policy descriptor that is used to distribute copies of policy descriptors to other locations such as policy enforcement points. For example, policy descriptors 502 in policy store 402 in FIG. 5 are the master policy descriptors.

The determination in step 1202 can be made by comparing policy descriptor timestamps of when the policy descriptors were created. Although the version is identified using timestamps, versioning numbers of other mechanisms can be used to identify versions. In this example, the master policy descriptor can be located in a datastore with a policy engine or in some other suitable location for storing master copies of the policy descriptors. Further, metadata timestamps can be used to determine whether changes have occurred in the information assets.

If the versions match, the process evaluates the information asset using the policy descriptor and the user context to generate a policy decision (step 1204). The process then returns a reply to the requestor with the policy decision (step 1206). The process terminates thereafter.

With reference again to step 1202, if the versions do not match, the process obtains a new copy of the policy descriptor from the policy engine (step 1208). The process then proceeds to step 1204 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
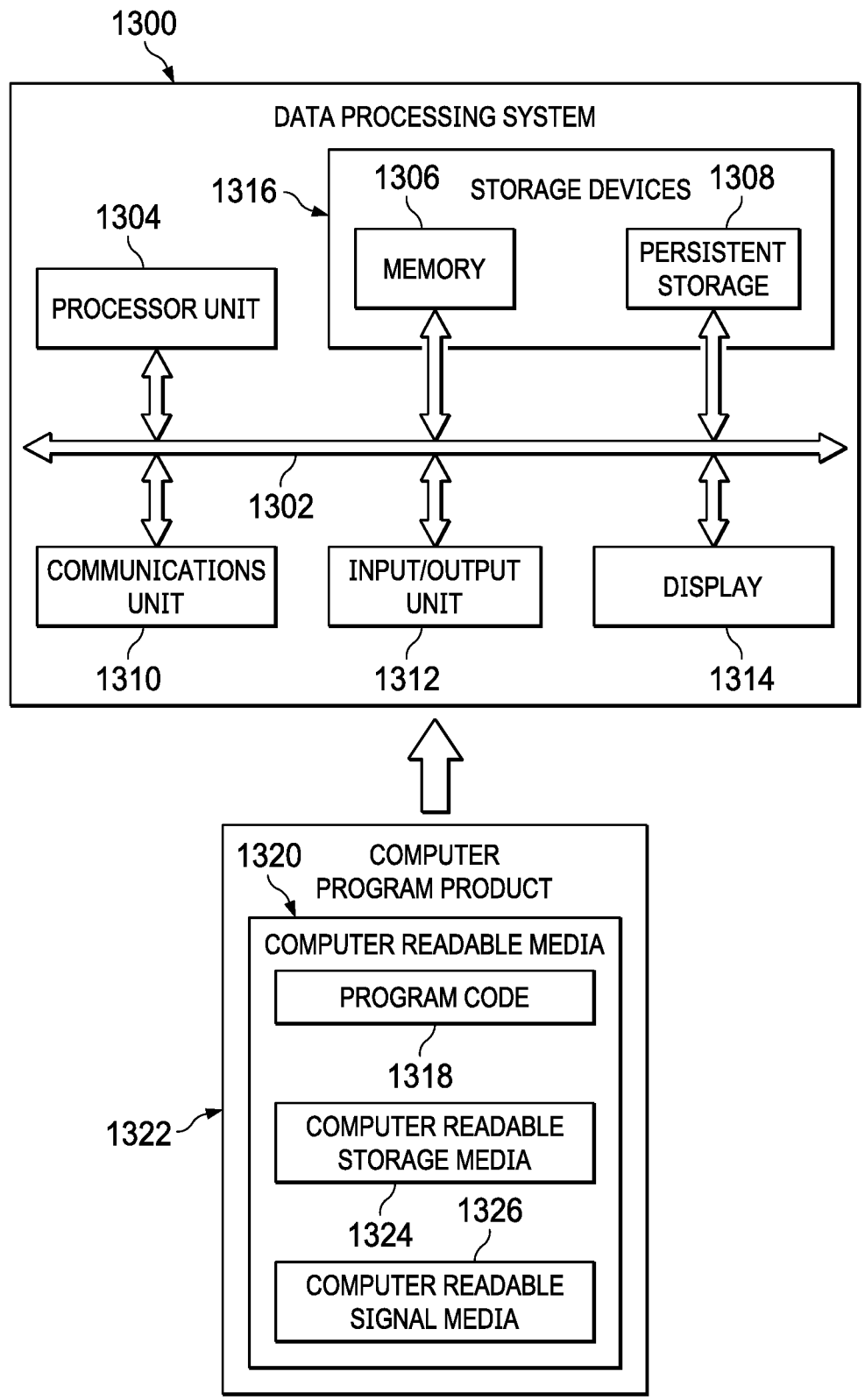
FIG. 13 is a block diagram of a data processing system in accordance with an illustrative embodiment.

Turning now to FIG. 13, a block diagram of a data processing system is depicted in accordance with an illustrative embodiment. Data processing system 1300 can also be used to implement cloud computing nodes 10 in FIG. 1 and computer system 312 in FIG. 3. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. For example, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is one or more physical or tangible storage devices used to store program code 1318 rather than a medium that propagates or transmits program code 1318.

Alternatively, program code 1318 can be transferred to data processing system 1300 using a computer-readable signal media. The computer-readable signal media can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1300 are not meant to provide architectural limitations to the manner in which different embodiments can be implemented. In some illustrative examples, one or more of the components may be incorporated in, or otherwise, form a portion of another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Thus, the illustrative embodiments provide a method, apparatus, system, and computer program product for evaluating an information asset with a policy. Rules in the policy are identified by a computer system. A set of common subexpressions between the rules is identified by the computer system in the policy. Metadata for the information asset is applied by the computer system to the set of common subexpressions to form partially evaluated rules for the policy for enforcement on the information asset. The partially evaluated rules are stored by the computer system in association with the information asset. The partially evaluated rules are a compressed form of the rules for the policy and reduce the amount of computer resources used to evaluate the information asset with the policy.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for evaluating an information asset with a policy, the method comprising:
    identifying, by a computer system, a set of rules in the policy;
    identifying, by the computer system, a set of common subexpressions present in each rule of a subset of rules in the set of rules in the policy, each common subexpression is a portion of each respective rule in the subset of rules that is a same subexpression;
    applying, by the computer system, metadata for the information asset to the set of common subexpressions to form partially evaluated rules for the policy; and
    storing, by the computer system, the partially evaluated rules in association with the information asset, wherein the partially evaluated rules are a compressed form of the rules for the policy and reduce computer resources used to evaluate the information asset with the policy.

2. The method of claim 1 further comprising:
    repeating steps of identifying the set of rules in the policy; identifying the set of common subexpressions present in each rule of a subset of rules in the set of rules in the policy, each common subexpression is a portion of each respective rule in the subset of rules that is a same subexpression; applying the metadata for the information asset to the set of common subexpressions; and storing the partially evaluated rules in association with the information asset in response to changes to the policy, changes to the metadata for the information asset, or changes to the policy and the metadata for the information asset, wherein continuous updating of the partially evaluated rules is enabled to ensure a desired enforcement of the policy.

3. The method of claim 1 further comprising:
    evaluating, by the computer system, the information asset with the policy using the partially evaluated rules stored in association with the information asset.

4. The method of claim 3, wherein evaluating, by the computer system, the information asset with the policy using the partially evaluated rules comprises:
    receiving, by the computer system, a request to evaluate the information asset with the policy;
    identifying, by the computer system, the partially evaluated rules for a stored result;
    identifying, by the computer system, a user context for the request; and
    evaluating, by the computer system, the information asset using the partially evaluated rules and the user context.

5. The method of claim 1, wherein applying, by the computer system, the metadata for the information asset to the set of common subexpressions to form the partially evaluated rules for the policy comprises:
    identifying, by the computer system, a set of predicates in the set of common subexpressions;
    determining, by the computer system, a set of values for the set of predicates; and
    evaluating, by the computer system, the set of common subexpressions using the set of values for the set of predicates to form the partially evaluated rules.

6. The method of claim 1 further comprising:
    creating, by the computer system, a set of subexpression descriptors corresponding to the set of common subexpressions;

associating, by the computer system, the set of subexpression descriptors with the set of common subexpressions using a set of subexpression identifiers; and replacing, by the computer system, the set of common subexpressions in the rules with the set of subexpression identifiers;

wherein applying, by the computer system, the metadata for the information asset to the set of common subexpressions to form the partially evaluated rules for the policy comprises:

applying, by the computer system, the metadata for the information asset to the set of common subexpressions identified in the set of subexpression descriptors to generate a result to form the partially evaluated rules.

7. The method of claim 6, wherein applying, by the computer system, the metadata for the information asset to the set of common subexpressions to form the partially evaluated rules for the policy further comprises:

removing, by the computer system, a rule from the rules in response to the result indicating that the rule is inapplicable.

8. The method of claim 1, wherein applying, by the computer system, the metadata for the information asset to the set of common subexpressions to form the partially evaluated rules for the policy comprises:

evaluating, by the computer system, a set of predicates in the set of common subexpressions using the metadata for the information asset to obtain evaluated subexpressions; and rewriting, by the computer system, the rules using evaluated subexpressions to form the partially evaluated rules.

9. The method of claim 1, wherein applying, by the computer system, the metadata for the information asset to the set of common subexpressions to form the partially evaluated rules for the policy comprises:

performing, by the computer system, at least one of replacing a rule from the set of rules with a policy decision when an evaluated subexpression in the rule causes the rule to have the policy decision or removing the rule from the set of rules when the evaluated subexpression in the rule causes the rule to be inapplicable.

10. The method of claim 1, wherein storing, by the computer system, the partially evaluated rules in association with the information asset comprises:

storing, by the computer system, the partially evaluated rules in at least one of a set of policy enforcement points in the computer system in which a policy enforcement point in the set of policy enforcement points evaluates the information asset using the partially evaluated rules for the policy in response to the policy enforcement point receiving a request to enforce the policy or in association with the information asset in a central location with a policy engine in which the policy engine evaluates the information asset using the partially evaluated rules for the policy in response to the policy engine receiving a request to evaluate the information asset with the policy from a policy enforcement point in the set of policy enforcement points.

11. A computer system for evaluating an information asset with a policy, the computer system comprising:

a bus system;

a storage device connected to the bus system, wherein the storage device stores program instructions; and a processor connected to the bus system, wherein the processor executes the program instructions to:

identify a set of rules in the policy;

identify a set of common subexpressions present in each rule of a subset of rules in the set of rules in the policy, each common subexpression is a portion of each respective rule in the subset of rules that is a same subexpression;

apply metadata for the information asset to the set of common subexpressions to form partially evaluated rules for the information asset; and store the partially evaluated rules in association with the information asset, wherein the partially evaluated rules are a compressed form of the rules for the policy and reduce computer resources used to apply the policy to the information asset.

12. The computer system of claim 11, wherein the computer system evaluates the information asset with the policy using the partially evaluated rules stored in association with the information asset.

13. The computer system of claim 12, wherein in evaluating the information asset with the policy using the partially evaluated rules, the computer system receives a request to evaluate the information asset with the policy; identifies the partially evaluated rules for a stored result; identifies a user context for the request; and evaluates the information asset using the partially evaluated rules and the user context.

14. The computer system of claim 11, wherein in applying, by the computer system, the metadata for the information asset to the set of common subexpressions to form the partially evaluated rules for the policy, the computer system identifies a set of predicates in the set of common subexpressions; determines a set of values for the set of predicates; and evaluates the set of common subexpressions using the set of values for the set of predicates to form the partially evaluated rules.

15. The computer system of claim 11, wherein the processor further executes the program instructions to:

create a set of subexpression descriptors corresponding to the set of common subexpressions;

associate the set of subexpression descriptors with the set of common subexpressions using a set of subexpression identifiers; and replace the set of common subexpressions in the rules with the set of subexpression identifiers;

wherein in applying the metadata for the information asset to the set of common subexpressions to form the partially evaluated rules for the policy, the computer system applies the metadata for the information asset to the set of common subexpressions identified in the set of subexpression descriptors to generate a result to form the partially evaluated rules.

16. The computer system of claim 11, wherein in applying, by the computer system, the metadata for the information asset to the set of common subexpressions to form the partially evaluated rules for the policy, the computer system performs at least one of replacing a rule from the rules with a policy decision in response to an evaluated subexpression in the rule causing the rule to have the policy decision or removing the rule from the rules in response to the evaluated subexpression in the rule causing the rule to be inapplicable.

17. A computer program product for evaluating an information asset with a policy, the computer program product comprising:

a computer-readable storage medium;

first program code, stored on the computer-readable storage medium, for identifying a set of rules in the policy;

second program code, stored on the computer-readable storage medium, for identifying a set of common subexpressions present in each rule of a subset of rules in the set of rules in the policy, each common subexpression is a portion of each respective rule in the subset of rules that is a same subexpression;

third program code, stored on the computer-readable storage medium, for applying metadata for the information asset to the common subexpressions to form partially evaluated rules for the information asset; and fourth program code, stored on the computer-readable storage medium, for storing the partially evaluated rules in association with the information asset, wherein the partially evaluated rules are a compressed form of the rules for the policy and reduce computer resources used to apply the policy to the information asset.

18. The computer program product of claim 17 further comprising:

fifth program code, stored on the computer-readable storage medium, for evaluating the information asset with the policy using the partially evaluated rules stored in association with the information asset.

19. The computer program product of claim 18, wherein fifth program code comprises:

program code, stored on the computer-readable storage medium, for receiving a request to evaluate the information asset with the policy;

program code, stored on the computer-readable storage medium, for identifying the partially evaluated rules for the stored result;

program code, stored on the computer-readable storage medium, for identifying a user context for the request; and program code, stored on the computer-readable storage medium, for evaluating the information asset using the partially evaluated rules and the user context.

20. The computer program product of claim 17, wherein third program code comprises:

program code, stored on the computer-readable storage medium, for performing at least one of replacing a rule from the set of rules with a policy decision in response to an evaluated subexpression in the rule causing the rule to have the policy decision or removing the rule from the set of rules in response to the evaluated subexpression in the rule causing the rule to be inapplicable.

* * * * *